(No Model.)
W. H. SOUTHWORTH & N. W. CALCUTT.
SAW GUMMER.
No. 439,698. Patented Nov. 4, 1890.
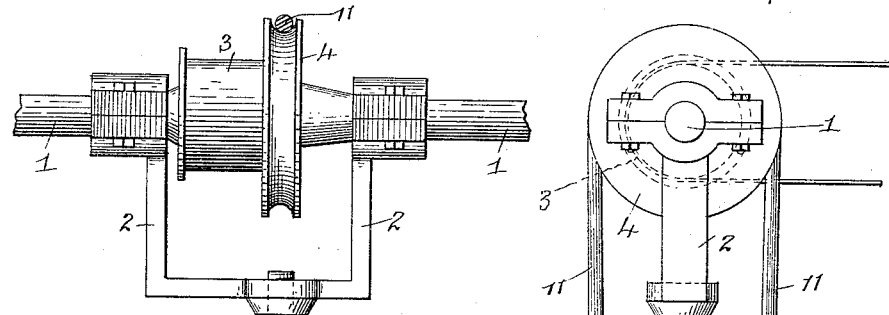
Fig. 1.  Fig. 2.
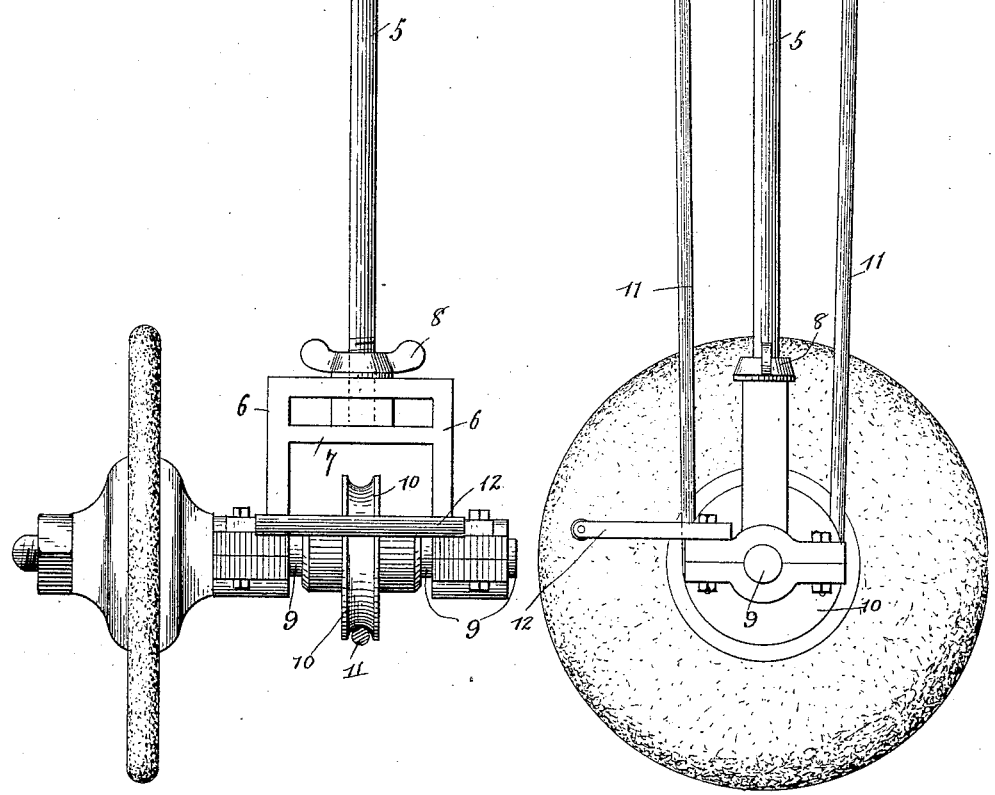
Witnesses
Jas. K. McCachran
Wm. Baggers
Inventors
Walter H. Southworth
Newton W. Calcutt
By their Attorneys.
C. A. Snow & Co.

UNITED STATES PATENT OFFICE.

WALTER H. SOUTHWORTH AND NEWTON W. CALCUTT, OF DYERSBURG, TENNESSEE.

SAW-GUMMER.

SPECIFICATION forming part of Letters Patent No. 439,698, dated November 4, 1890.

Application filed May 31, 1890. Serial No. 353,733. (No model.)

*To all whom it may concern:*

Be it known that we, WALTER H. SOUTHWORTH and NEWTON W. CALCUTT, citizens of the United States, residing at Dyersburg, in the county of Dyer and State of Tennessee, have invented a new and useful Saw-Gummer, of which the following is a specification.

This invention relates to saw-gummers; and it has for its object to construct a machine of this class which shall be simple in construction and efficient in operation, and it may be readily adjusted to place the emery-wheel, which forms a part of the machine, at any desired angle, thereby enabling saws to be readily gummed while in position upon the mandrel or arbor.

The invention consists in the improved construction and arrangement of the parts of the device, which will be hereinafter fully described, and particularly pointed out in the claims.

In the drawings, Figure 1 is a front view of our improved saw-gumming machine. Fig. 2 is a side view of the same.

Like numerals of reference indicate like parts in both the figures.

1 designates a shaft, which is intended to be mounted loosely in suitable bearings. 2 designates a yoke, which is clamped upon the said shaft, so as to be capable of swinging with the latter.

Between the arms of the yoke 2 is journaled a pulley having two faces 3 and 4, the former of which may be connected by means of a belt or band with a suitable source of power.

Suitably attached to the outer end of the yoke 2 is an arm or rod 5, at the outer end of which is mounted a second yoke 6, having a cross-bar 7. The outer end of the said yoke and cross-bar have screw-threaded perforations to receive the threaded end of the rod 5, which latter is provided with a clamping-nut 8, which may be tightened up against the yoke 6, which latter may thus be held securely at any desired angle with relation to the yoke at the upper end of the rod 5.

The outer ends of the arms of the yoke 6 are provided with bearings for a shaft 9, upon which is securely mounted a pulley 10, which is to be connected by means of a belt or band 11 with the pulley 4 upon the shaft 1. The outer end of the shaft 9 carries the emery gumming-wheel 11, and the yoke 6 is provided with a handle 12, by means of which it may be readily manipulated.

The operation of this invention will be readily understood from the foregoing description, taken in connection with the drawings hereto annexed, by those skilled in the art to which it appertains.

The construction of the device is simple and inexpensive, and it may be easily operated.

Having thus described our invention, we claim—

1. The combination of the shaft carrying the swinging yoke, a rod extending outwardly from said yoke, a yoke mounted adjustably at the outer end of said rod, a shaft journaled in the adjustable yoke and carrying an emery-wheel, a band connecting said pulley with a pulley upon the supporting-shaft, and means for transmitting motion to the latter pulley, substantially as set forth.

2. In a saw-gumming machine, the combination of a supporting-shaft, a swinging yoke mounted thereon, a connecting-rod screw-threaded at its outer end, a yoke or frame mounted upon the screw-threaded end of said rod and carrying a shaft having an emery-wheel mounted thereon, a clamping-nut to secure the yoke at any desired adjustment, and means for transmitting motion to the shaft carrying the emery-wheel, substantially as set forth.

3. The combination of the supporting-shaft, the swinging yoke, the rod extending outwardly from the latter, the yoke mounted adjustably at the outer end of said rod and having the handle, the clamping-nut, the shaft journaled in the said adjustable yoke and carrying an emery-wheel, and means for transmitting motion to the said shaft, substantially as set forth.

4. The combination, with the supporting-shaft and the swinging yoke secured thereon, of the connecting-rod extending outwardly from said yoke, the adjustable yoke having a cross-bar and provided with screw-threaded perforations in its outer end and in the said cross-bar to receive the threaded outer end of the connecting-rod, the clamping-nut, the shaft journaled in the adjustable yoke and carrying an emery-wheel, and means for transmitting motion to said shaft, substantially as and for the purpose set forth.

In testimony that we claim the foregoing as our own we have hereto affixed our signatures in presence of two witnesses.

WALTER H. SOUTHWORTH.
NEWTON W. CALCUTT.

Witnesses:
WILLIAM F. WILSON,
STEPHEN CALKIN.